T. ANDREW.
CONDITIONING AND DRYING MACHINE.
APPLICATION FILED APR. 11, 1917.

1,303,009.

Patented May 6, 1919.
6 SHEETS—SHEET 1.

Inventor:
Tom Andrew,

T. ANDREW.
CONDITIONING AND DRYING MACHINE.
APPLICATION FILED APR. 11, 1917.

1,303,009.

Patented May 6, 1919.
6 SHEETS—SHEET 3.

Inventor:
Tom Andrew,
Attorney.

T. ANDREW.
CONDITIONING AND DRYING MACHINE.
APPLICATION FILED APR. 11, 1917.

1,303,009.

Patented May 6, 1919.
6 SHEETS—SHEET 4.

Inventor:
Tom Andrew,
by Spear, Middleton, Donaldson & Spear
Attorney

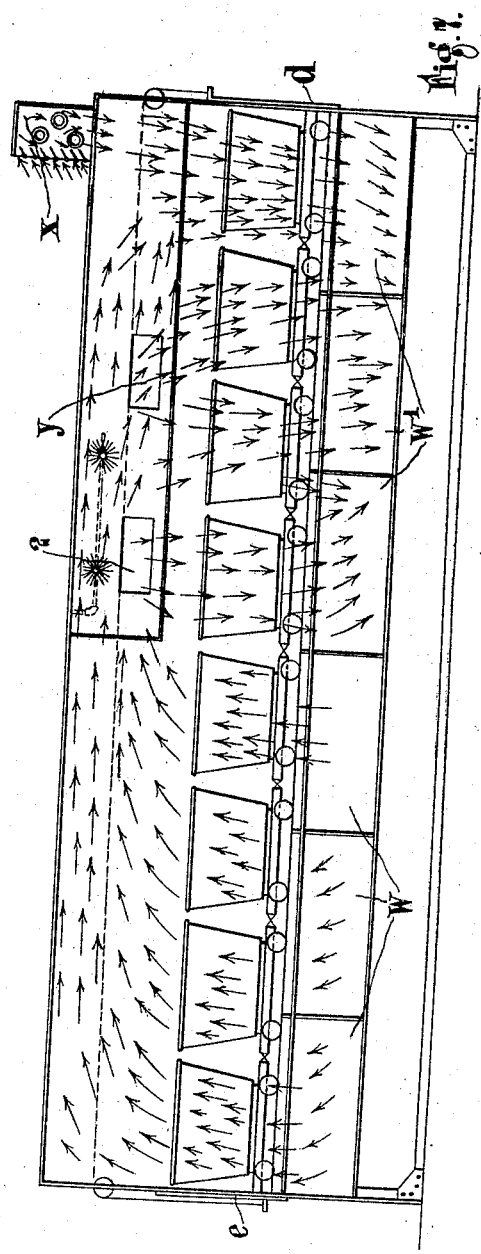

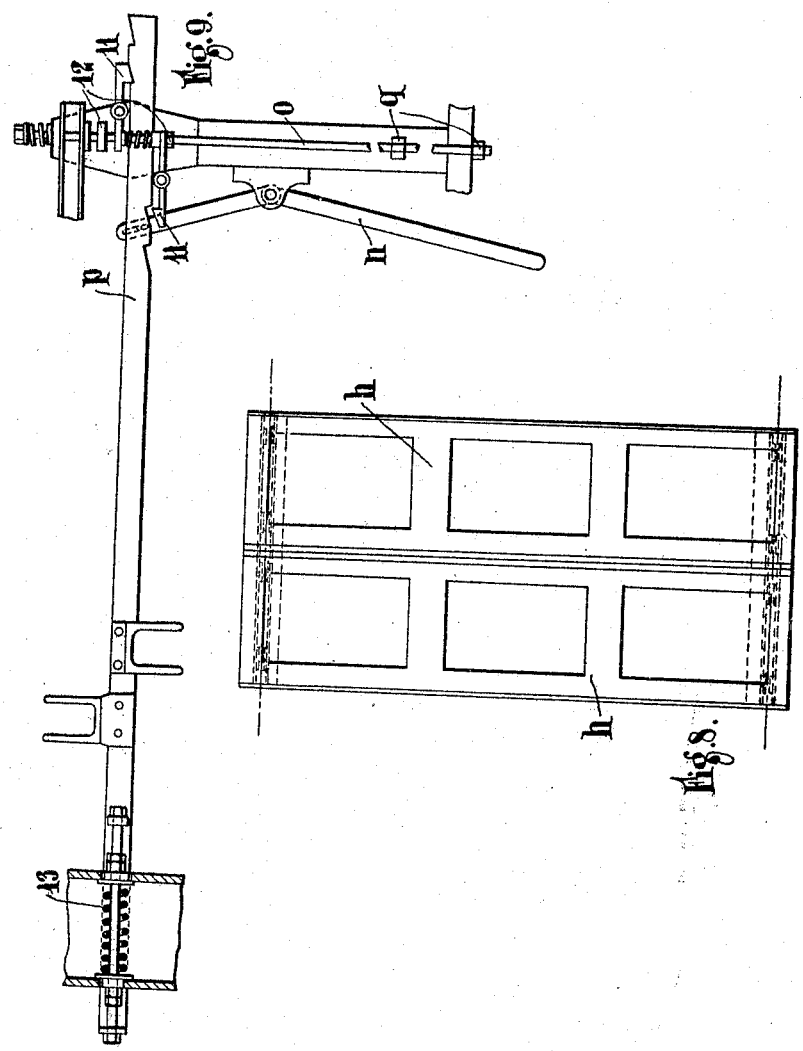

UNITED STATES PATENT OFFICE.

TOM ANDREW, OF MANCHESTER, ENGLAND.

CONDITIONING AND DRYING MACHINE.

1,303,009.  Specification of Letters Patent.  Patented May 6, 1919.

Application filed April 11, 1917. Serial No. 161,323.

*To all whom it may concern:*

Be it known that I, TOM ANDREW, a subject of the King of Great Britain and Ireland, and resident of 4 Langford road, Heaton Moor, Manchester, England, have invented certain new and useful Improvements in Conditioning and Drying Machines, of which the following is a specification.

This invention relates to conditioning and drying apparatus for yarn and other materials, and has for its object to provide for the more effective conditioning of yarn than has heretofore been obtainable and for the ready adaptation of the conditioning machine for drying purposes.

My invention comprises the improved combinations and arrangements of parts hereinafter described and claimed.

Referring to the accompanying explanatory drawings:—

Fig. 7 is a diagrammatic view showing the circulation of air through the machine. Fig. 8 is a plan view of a trolley employed for carrying material through the machine, and Fig. 9 is a detail view of the elevator control means.

The same reference letters in the different views indicate the same parts.

In the illustrated application of my invention, I make the conditioning chamber $a$ of any usual form having its entry $b$ and exit $c$ at opposite ends, suitable inter-connected and balanced doors $d$, $e$ being provided for controlling the entry and exit openings. One door opens with an upward movement, while the other door opens by a downard movement (see Fig. 7) so that by inter-connecting the doors by the flexible connection $e'$ they balance one another. Rails $f$ are disposed on the opposite sides of the machine and the yarn in suitable packages or receptacles $g$ is placed upon trolley-like platforms $h$ having wheels which run upon the rails $f$ aforesaid. Each package is supported over a gap or opening in the platform $h$ so that the air currents can pass through the packages. A plurality of such trolleys are in the chamber simultaneously and when one is withdrawn another is inserted. The trolleys may couple together upon impact, the coupling being unlocked when the trolley which is being withdrawn from the chamber is lowered from the adjacent trolley to the ground level. The entering trolley is lifted into position by a suitable elevator $i$ and the outgoing trolley lowered by an elevator $j$, the two elevators being operatively connected by the chains $k$ on the drum $m$ so that they work in unison. The elevators are put into motion by moving the belt shifting lever $n$ and so the belt shipper $p$ (see Fig. 9) in one or other direction, where the shipper is held by one of the pivoted catches 11 actuated by the rod $o$. Collars 12 on the latter engage the pivoted catches so that when the elevator $i$ reaches the upper or lower end of its traverse it engages one or other of the stops $q$ on the rod $o$ and causes said rod to have a longitudinal movement insuring that the particular catch which is in operation is released: the spring 13 then returns the belt shipper to its neutral position with the belt on the loose pulley. The passage or travel of the platforms $h$ through the chamber may be effected by a continuous chain $r$ or the like having an outwardly projecting arm $s$ for engaging one trolley. This may be the first trolley, when the other trolleys will be pushed forward. If desired, however, the rails $f$ may be inclined so that the trolleys travel automatically forward and the withdrawal only is regulated.

Figure 1:
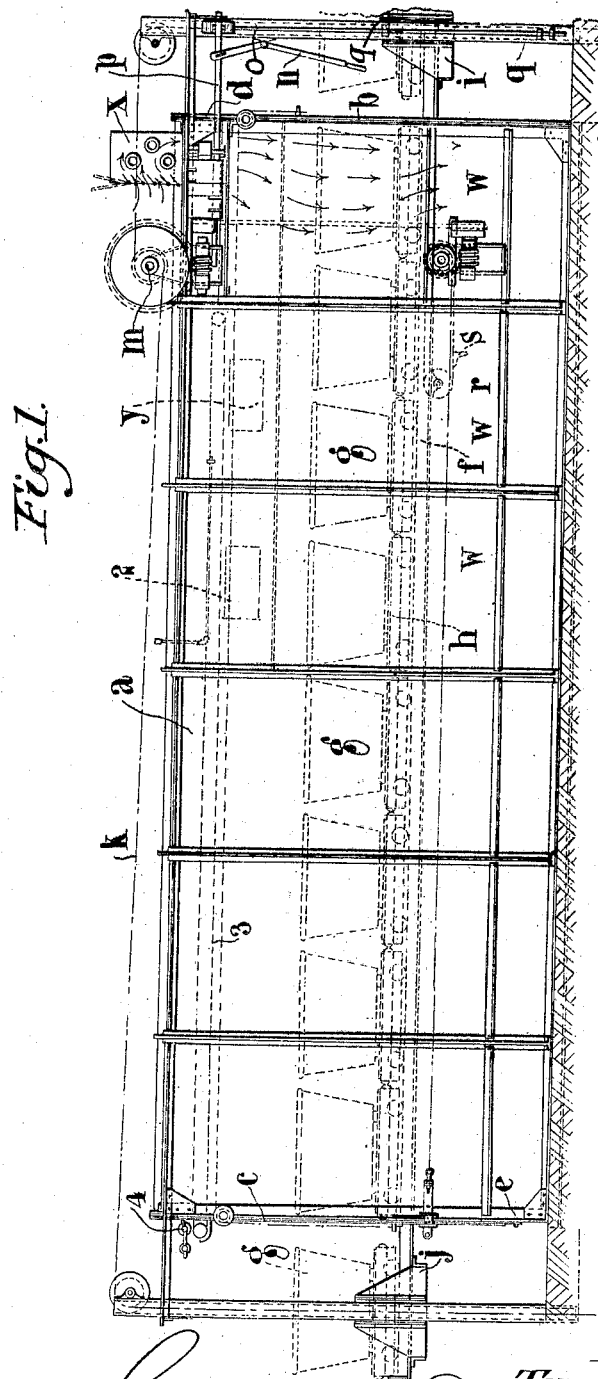
Figure 1 is a side elevation, Fig. 2 a plan view, Fig. 3 an end elevation looking from left to right of Fig. 1, Fig. 4 an end elevation looking from right to left of Fig. 1 but with the lifting gear removed, Fig. 5 an end view similar to Fig. 4 but with the lifting gear in place.
Figure 2:
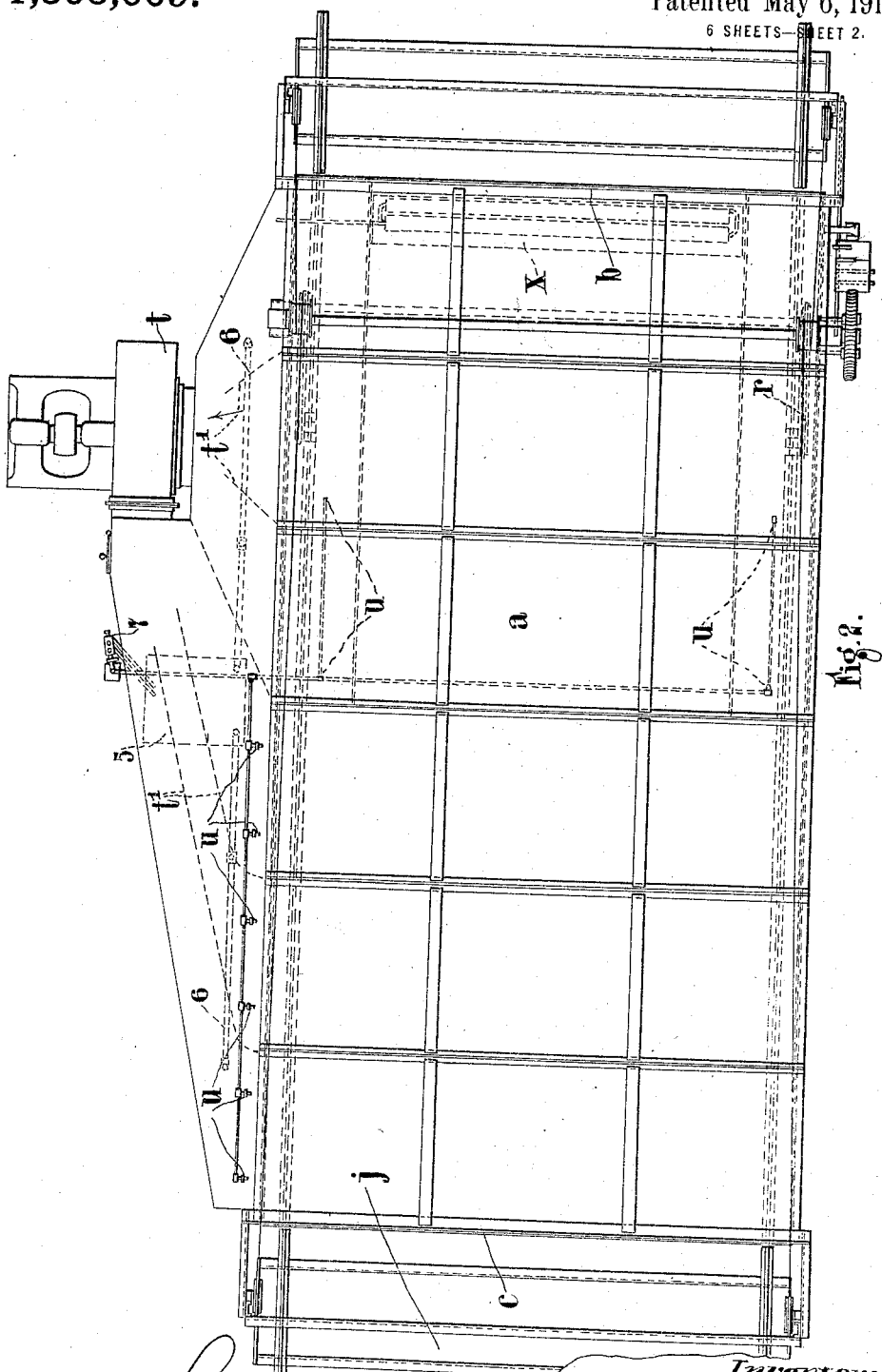
Figure 3:
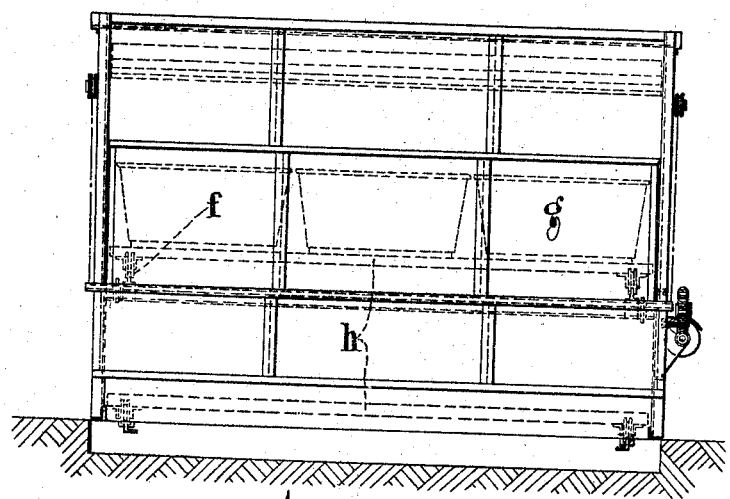
Figure 4:
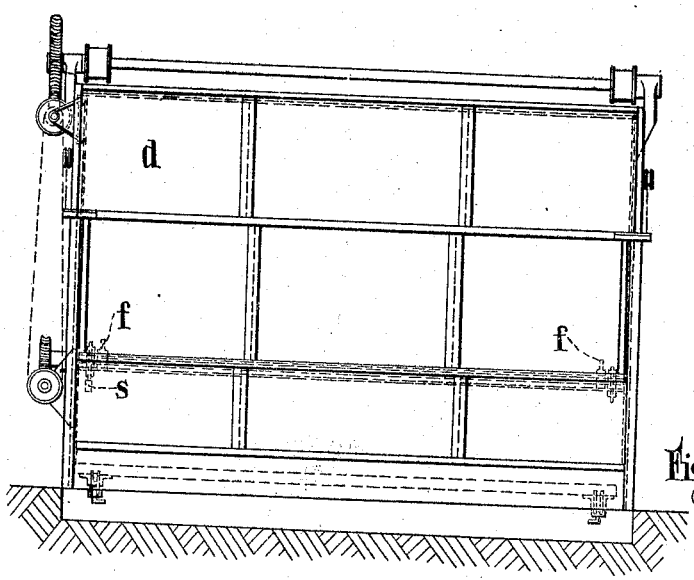
Figure 5:
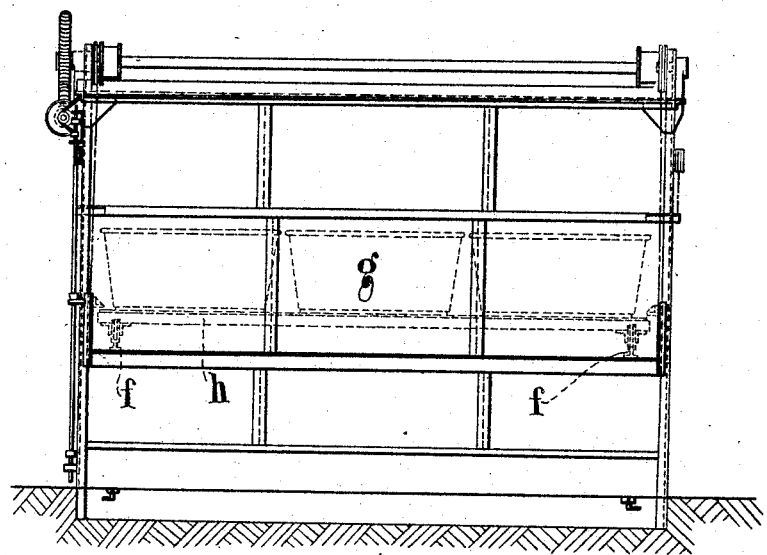
Figure 6:
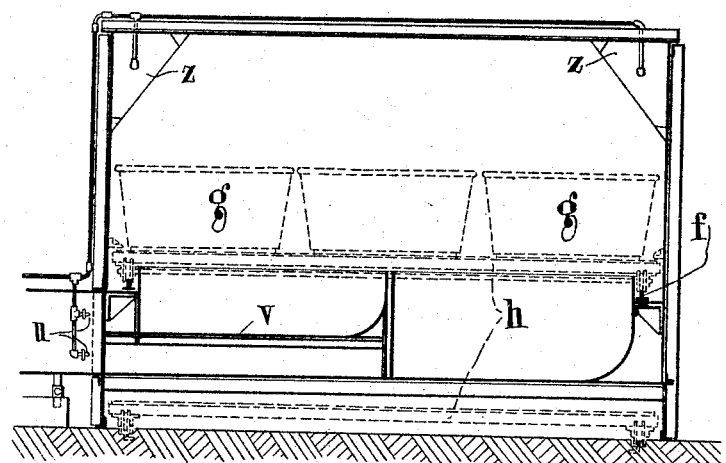
Fig. 6 is a cross section through the apparatus or machine.

The air currents are produced by a fan $t$ which delivers to the portion of the machine adjacent the exit and draws from the portion adjacent the entry. The delivery and the suction passages are divided by partitions $t'$ so that a plurality of currents enter and leave the machine. For example, the entering air passages may be three in number (as shown at $w$, Fig. 7) disposed at the base of the chamber and each passage may have separate moistening means $u$ and also, if desired, warming means (not shown) though the warming of the whole of the air may be effected at one point. Means such as division pieces $v$ may be provided (see Fig. 6) which divide the width of the chamber into two parts and insure a proper distribution of the air across the width of the chamber. I prefer to increase the degree of moisture in the air toward the exit of the machine. 5 indicates a tank to which water from the air ducts may drain by way of the pipes 6 and from which it is pumped to the spraying nozzles u by the ejector indicated at 7.

The moistened air rises through the yarn packages and loses the greater portion of its moisture. It then travels along the top of the chamber and then travels downward through the yarn packages in three streams passing to three channels w' beneath the trolleys and so to the suction side of the fan. The air passing to each channel w' may be separately treated. For example, the portion traveling to the first or inlet section may be heated only and have a portion of dry heated air from the heater x added thereto (see Fig. 7); the portion for the second section may be slightly moistened by spray issuing through apertures y in the divided off part z (see Fig. 6) and the portion for the third section receive a greater quantity of moisture from the similar aperture 2. Thus, commencing with the dry air section, the other sections have increasing degrees of moisture in the air passing therethrough.

The trolleys from the elevators j return to the inlet end of the machine by the runway 10 beneath the machine.

If desired, the first section may receive an entirely independent supply of thoroughly wet air or have water sprayed directly on to the yarn therein for the preliminary treatment of the latter, this being advantageous in the case of ring and other yarns. This supply will be obtained from the apparatus indicated at x.

An endless cloth or the like 3 may be traversed along below the roof or top of the chamber to absorb the moisture and prevent the formation of drops. Such cloth may be subjected to a squeezing action by a roller 4 in any suitable manner for extracting the liquid therefrom.

When it is desired to employ my apparatus for drying purposes only, the air moistening means are disconnected and the air supply heated. The air may then be entirely drawn from the atmosphere instead of being circulated in a closed circuit through the machine. Or, a portion may be circulated continuously and a portion drawn from the atmosphere. The air in its passage through the machine has its temperature gradually raised but travels in the opposite direction to the yarn so that the temperature to which the latter is subjected is greatest where it enters the machine and the yarn is in its wettest condition.

I do not limit myself to the details of construction hereinbefore described, but may modify same to suit requirements.

Having now described my invention what I claim as new and desire to secure by Letters Patent is:—

1. In apparatus for conditioning yarn and other materials, in combination, a chamber, air circulating means connected at its delivery side to one part and at its suction side to the other part of said chamber, means dividing the air both entering and leaving the chamber into a plurality of currents moving in parallel, means adding moisture to said air currents in gradually increasing quantity from the inlet to the exit of the chamber, and means introducing a separate supply of air adjacent to the inlet to the chamber, as set forth.

2. In apparatus for treating yarn and other materials, in combination, a chamber, air circulating means connected at its delivery side to one part and at its suction side to the other part of said chamber, means dividing the air both entering and leaving the chamber into a plurality of currents moving in parallel, inlet and outlet doors upon the opposite ends of said chamber, rails extending through the chamber, a plurality of trucks having gaps therein upon said rails, the said trucks dividing the chamber into upper and lower portions, receptacles for holding the material being treated over said gaps, means traversing said trucks and means for the separate treatment of the air currents prior to their passage through the receptacles in one direction and prior to their return through the receptacles in the other direction, elevators for raising and lowering said trucks into and from position in the chamber, and automatic control means for bringing the elevators to rest and a runway for said trucks beneath the chamber, as set forth.

In testimony whereof I have signed my name to this specification in the presence of two subscribing witnesses.

TOM ANDREW.

Witnesses:
T. ROWBOTHAM,
ARTHUR HUGHES.